United States Patent
Lyu et al.

(10) Patent No.: US 10,347,014 B2
(45) Date of Patent: Jul. 9, 2019

(54) SYSTEM AND METHOD FOR IMAGE RECONSTRUCTION

(71) Applicant: SHANGHAI UNITED IMAGING HEALTHCARE CO., LTD., Shanghai (CN)

(72) Inventors: Yang Lyu, Shanghai (CN); Yu Ding, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 101 days.

(21) Appl. No.: 15/394,633

(22) Filed: Dec. 29, 2016

(65) Prior Publication Data
US 2018/0040136 A1 Feb. 8, 2018

Related U.S. Application Data

(63) Continuation of application No. PCT/CN2016/092881, filed on Aug. 2, 2016.

(30) Foreign Application Priority Data

Aug. 2, 2016 (CN) ............ 2016 1 0626362
Aug. 2, 2016 (CN) ............ 2016 1 0626367

(51) Int. Cl.
*G06T 7/50* (2017.01)
*G06T 11/00* (2006.01)

(52) U.S. Cl.
CPC ....... *G06T 11/006* (2013.01); *G06T 2211/424* (2013.01)

(58) Field of Classification Search
CPC .......... G06T 11/006; G06T 3/4007; G06T 2207/10081; G06T 2207/20021; G06T 2211/424
See application file for complete search history.

(56) References Cited

U.S. PATENT DOCUMENTS 7,693,318 B1 * 4/2010 Stalling ............. G06T 11/006
128/922
7,734,119 B2 6/2010 Cheryauka et al.
(Continued)

FOREIGN PATENT DOCUMENTS

CN 104751499 A 7/2015
CN 105741303 A 7/2016
(Continued)

OTHER PUBLICATIONS

Q-S Dai et al., Implementation of high-resolution pinhole SPECT 3D image reconstruction, Atomic Energy Science and Technology, 43(11): 1034-1038 (2009).
(Continued)

*Primary Examiner* — Mekonen T Bekele
(74) *Attorney, Agent, or Firm* — Metis IP LLC

(57) ABSTRACT

A system and method for image reconstruction are provided. A first region of an object may be determined. The first region may correspond to a first voxel. A second region of the object may be determined. The second region may correspond to a second voxel. Scan data of the object may be acquired. A first regional image may be reconstructed based on the scan data. The reconstruction of the first regional image may include a forward projection on the first voxel and the second voxel and a back projection on the first voxel.

17 Claims, 14 Drawing Sheets

(56) References Cited

U.S. PATENT DOCUMENTS

| | | | |
|---|---|---|---|
| 8,351,571 B2 | 1/2013 | Brinks et al. | |
| 9,435,901 B2 | 9/2016 | Pistorius et al. | |
| 9,462,988 B2* | 10/2016 | Hansis | G06T 11/005 |
| 2002/0113787 A1* | 8/2002 | Ray | G06T 15/08 345/424 |
| 2005/0041781 A1 | 2/2005 | Jefferson | |
| 2005/0152590 A1* | 7/2005 | Thieret | G06T 11/006 382/131 |
| 2007/0195923 A1* | 8/2007 | Netsch | G06T 11/005 378/4 |
| 2008/0193003 A1 | 8/2008 | Shechter | |
| 2008/0205729 A1* | 8/2008 | Ziegler | G06T 11/006 382/131 |
| 2009/0202036 A1* | 8/2009 | Ziegler | G06T 11/006 378/19 |
| 2012/0051626 A1* | 3/2012 | Long | G06T 11/006 382/154 |
| 2013/0294570 A1 | 11/2013 | Hansis | |
| 2014/0161340 A1* | 6/2014 | Zeng | G06T 11/006 382/131 |
| 2015/0022521 A1 | 1/2015 | Loop | |
| 2015/0154767 A1 | 6/2015 | Liu et al. | |
| 2017/0103551 A1 | 4/2017 | Sun et al. | |
| 2017/0161923 A1* | 6/2017 | Nakano | G06T 3/4007 |

FOREIGN PATENT DOCUMENTS

| | | |
|---|---|---|
| CN | 105809731 A | 7/2016 |
| CN | 106296764 A | 1/2017 |
| CN | 106296765 A | 1/2017 |

OTHER PUBLICATIONS

Q Zhang et al., High quality ordered subset expectation maximization reconstruction algorithm based on multi-resolution for PET images, Journal of Computer Applications, 33(3): 648-650, 659 (2013).

J E Ortuno et al., Multi-grid 3D-OSEM reconstruction technique for high resolution rotating-head PET scanners, 2006 IEEE Nuclear Science Symposium Conference Record, 2215-2218 (2006).

International Search Report in PCT/CN2016/092881 dated May 8, 2017, 8 pages.

First Office Action in Chinese application No. 201610626367.3 dated Aug. 1, 2018, 30 pages.

First Office Action in Chinese application No. 201610626362.0 dated Jul. 3, 2018, 27 pages.

The second Office Action in Chinese Application No. 201610626362.0 dated Mar. 14, 2019, 22 pages.

\* cited by examiner

100b

SYSTEM AND METHOD FOR IMAGE RECONSTRUCTION

CROSS-REFERENCE TO RELATED APPLICATIONS

This application claims priority of Chinese Patent Application No. 201610626367.3 filed on Aug. 2, 2016, Chinese Patent Application No. 201610626362.0 filed on Aug. 2, 2016, and PCT Application PCT/CN2016/092881 filed on Aug. 2, 2016, the entire contents of each of which are hereby incorporated by reference.

TECHNICAL FIELD

This present disclosure relates to a system and method for image reconstruction, and more particularly, relates to a system and method for multi-resolution image reconstruction.

BACKGROUND

Positron emission tomography (PET) technology has been widely used in clinical examination and disease diagnosis in recent years. A wide-field PET device including a plurality of axial PET units has a wide field of view and may be used to scan all or part of an object. Image reconstruction is a key technology in the field of PET. However, traditional reconstruction techniques may be unable to simultaneously reconstruct images of different portions of a scanned object based on different reconstruction parameters. Additional, a traditional reconstruction technique may be complex and need a large amount of calculation resources. Thus, it may be desirable to develop an image reconstruction method and system that may solve the above mentioned problems.

SUMMARY

An aspect of the present disclosure relates to a method for image reconstruction the method. The method may include one or more of the following operations. A first region of an object may be determined. The first region may correspond to a first voxel. A second region of the object may be determined. The second region may correspond to a second voxel. Scan data of the object may be acquired. A first regional image may be reconstructed based on the scan data. The reconstruction of the first regional image may include a forward projection on the first voxel and the second voxel and a back projection on the first voxel.

In some embodiments, a second regional image may be reconstructed based on the scan data. The reconstruction of the second regional image may include a forward projection on the first voxel and the second voxel and a back projection on the second voxel.

In some embodiments, the reconstructing a first regional image may include performing a first filtering on the first regional image. The reconstructing a second regional image may include performing a second filtering on the second regional image.

In some embodiments, the reconstructing a first regional image may include iteratively reconstructing the first regional image based on the scan data for a first number of iterations. The reconstructing a second regional image may include iteratively reconstructing the second regional image based on the scan data for a second number of iterations.

In some embodiments, the first number of iterations is different from the second number of iterations.

In some embodiments, the reconstructing a first regional image and the reconstructing a second regional image may be performed based on an Ordered Subset Expectation Maximization algorithm.

In some embodiments, the forward projection on the first voxel and the second voxel may be performed along a line of response.

In some embodiments, the method for image reconstruction may further include one or more of the following operations. Structure information of the object may be acquired. The first region and the second region may be determined based on the structure information.

In some embodiments, the method for image reconstruction may further include one or more of the following operations. A first image matrix and a second image matrix may be determined. The first voxel may be stored in the first image matrix and the reconstructing a first regional image may include reconstructing the first image matrix. The second voxel may be stored in the second image matrix and the reconstructing a second regional image may include reconstructing the second image matrix.

In some embodiments, the method for image reconstruction may further include generating a lookup table. The lookup table may record a correlation between the first image matrix and the first voxel, or a correlation between the second image matrix and the second voxel.

In some embodiments, the correlation between the first image matrix and the first voxel may include a correlation between the first image matrix and a rearranged first voxel.

In some embodiments, a first voxel size corresponding to the first region may be set, and a second voxel size corresponding to the second region may be set. A merged matrix may be determined. The voxel size of the merged matrix may equal to the smaller voxel size of the first voxel size and the second voxel size. The first image matrix and the second image matrix may be filled into the merged matrix.

An aspect of the present disclosure relates to another method for image reconstruction. The method may include one or more of the following operations. An image matrix which corresponds to a scanned region may be determined. The scanned region may include at least one sub-scanned region. The image matrix may be divided into a plurality of sub-image matrixes. A sub-image matrix of the one or more sub-image matrixes may correspond to a sub-scanned region of the at least one sub-scanned region. One or more of the sub-image matrixes may be transformed to generate one or more transformed matrixes. The one or more of the sub-image matrixes may be reconstructed based on the one or more transformed matrixes. The image matrix may be reconstructed based on the one or more reconstructed sub-image matrixes.

In some embodiments, the transforming one or more of the sub-image matrixes may include compressing the one or more of the sub-image matrixes or rearranging the one or more of the sub-image matrixes.

In some embodiments, the method for image reconstruction may further include generating a lookup table of the image matrix and the one or more of the sub-image matrixes. The lookup table may record a manner of the compressing the one or more of the sub-image matrixes or a manner of the rearranging the one or more of the sub-image matrixes.

In some embodiments, the transforming one or more of the sub-image matrixes may include decompressing the one or more sub-image matrixes based on the lookup table.

An aspect of the present disclosure relates to a system for image reconstruction. The system may include an imaging device and a processor. The imaging device may be configured to acquire scan data of an object. The processor may include an acquisition module and a reconstruction module. The acquisition module may be configured to acquire information regarding a first region of the object, a size of a first voxel corresponding to the first region, a second region of the object and a size of a second voxel corresponding to the second region. The reconstruction module may be configured to reconstruct the first regional image. The reconstruction of the first regional image may include a forward projection on the first voxel and the second voxel; and a back projection on the first voxel.

In some embodiments, the reconstruction module may be configured to reconstructing a second regional image based on the scan data. The reconstruction of the second regional image may include a forward projection on the first voxel and the second voxel; and a back projection on the second voxel.

In some embodiments, the reconstruction module may include an image matrix generation unit. The image matrix generation unit may be configured to determine a first image matrix and a second image matrix. The first voxel may be stored in the first image matrix. The reconstructing a first regional image may include reconstructing the first image matrix. The second voxel may be stored in the second image matrix. The reconstructing a second regional image may include reconstructing the second image matrix.

In some embodiments, the reconstruction module may include an image matrix processing unit. The image matrix processing unit may be configured to perform one or more operations on the first image matrix and the second image matrix. The operations may include image matrix rotation, image matrix compression, image matrix decompression, image matrix rearrangement, image matrix filling and image matrix merging.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of example in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

As used herein, the singular forms "a," "an," and "the" may be intended to include the plural forms as well, unless the context clearly indicates otherwise. It will be further understood that the terms "comprise," and/or "include," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Although the present disclosure makes various references to certain modules in the system according to some embodiments of the present disclosure, any number of different modules may be used and run on the client and/or server. The modules are illustrative only, and different aspects of the systems and methods may use different modules.

A flowchart is used in the present disclosure to describe operations performed by a system according to some embodiments of the present disclosure. It should be understood that the preceding or following operations are not necessarily performed exactly in sequence. Instead, various steps may be processed in reverse order or simultaneously.

At the same time, other steps may be added to the operations, or removing one or more steps from the operations.

The term "scanned region" may refer to a physical region to be scanned. The term "reconstruction region" may refer to a physical region corresponding to a reconstructed image matrix. Unless the context clearly indicates an exception, the terms "scanned region," "reconstruction region," and "physical region" may have the same meaning and may be used interchangeably in the present disclosure.

The term "element" may refer to the smallest component in an image matrix. The term "voxel" may refer to the smallest component in a physical region. The "element" in an image matrix may correspond to the "voxel" in a physical region in the present disclosure.

Figure 1A:
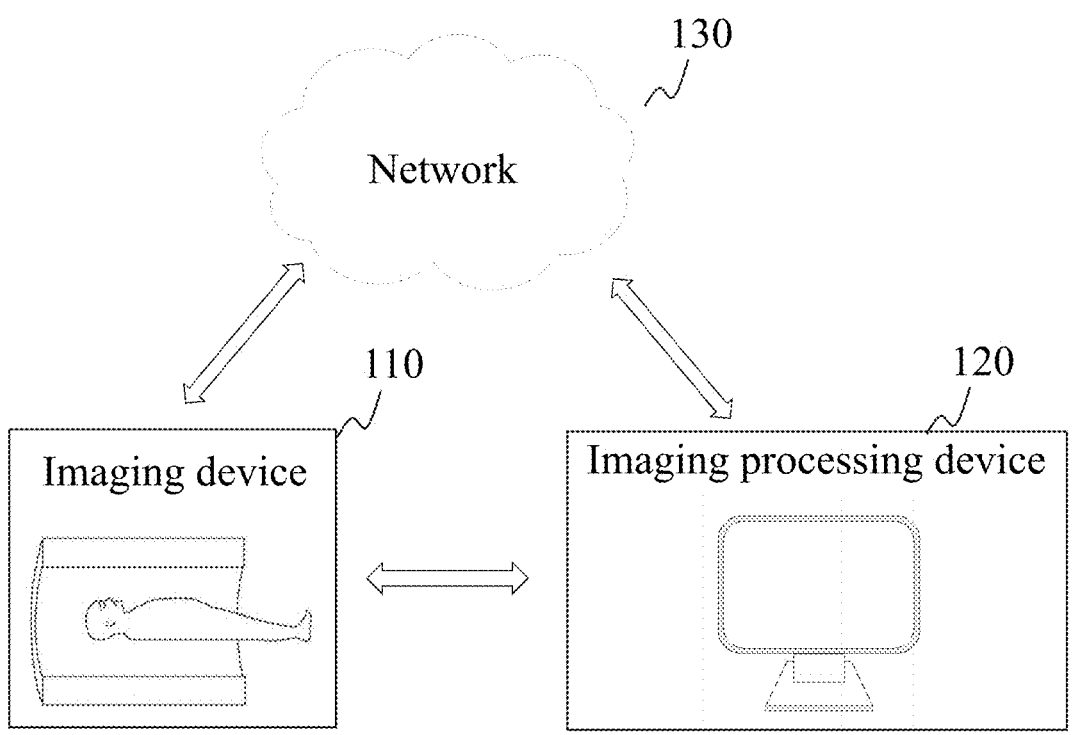
FIG. 1A is a block diagram of a system for image reconstruction according to some embodiments of the present disclosure.

FIG. 1A is a block diagram of an image reconstruction system according to some embodiments of the present disclosure. System 100 may include an imaging processing device 120, a network 130 and an imaging device 110. In some embodiments, at least part of image processing device 120 may be implemented on computer 100b shown in FIG. 1B.

Imaging device 110 may be a single modality imaging system, e.g., a Digital Subtraction Angiography (DSA) system, a Magnetic Resonance Angiography (MRA) system, a Computed Tomography Angiography (CTA), a Positron Emission Tomography (PET) system, a Single Photon Emission Computed Tomography (SPECT) system, a Computed Tomography (CT) system, a Digital Radiography (DR) system, etc. The system may be a multi-modality imaging system, e.g., a Computed Tomography-Positron Emission Tomography (CT-PET) system, a Positron Emission Tomography-Magnetic Resonance Imaging (PET-MRI) system, a Single Photon Emission Computed Tomography-Positron Emission Tomography (SPECT-PET) system, a Digital Subtraction Angiography-Magnetic Resonance Imaging (DSA-MR) system, etc.

Imaging processing device 120 may acquire information and process the acquired information to reconstruct an image. The acquired information may be obtained from imaging device 110, network 130, or be produced by imaging processing device 120. Imaging processing device 120 may be an electronic device or a server. The electronic device may include a portable computer, a tablet, a mobile phone, an intelligent terminal device, or the like, or a combination thereof. Imaging processing device 120 may be centralized, such as a data center. Imaging processing device 120 may be distributed, such as a distributed system. Imaging processing device 120 may be local or remote. In some embodiments, the acquired information may include image information of one or more objects. The image information may be acquired by scanning or otherwise. In some embodiments, imaging processing device 120 may be implemented on computer 100b shown in FIG. 1B.

In some embodiments, imaging processing device 120 may include a central processing unit (CPU), an application specific integrated circuit (ASIC), an application specific instruction set processor (ASIP), a physics processing unit (PPU), a digital processing processor (DSP), a field-programmable gate array (FPGA), an programmable logic device (PLD), a processor, a microprocessor, a controller, a microcontroller, or the like, or a combination thereof.

Network 130 may be a single network or a combination of a plurality of different kinds of networks. For example, the network may be a local area network (LAN), a wide area network (WAN), a public network, a personal network, a private network, a public switched telephone network (PSTN), the internet, a wireless network, a virtual network, or the like, or a combination thereof. Network 130 may include multiple network access points (NAP). The wired network may including using a metal cable, an optical cable, a hybrid cable, an interface, or the like, or a combination thereof. The wireless network may include a local area network (LAN), a wide area network (WAN), a bluetooth, a zigbee, a near field communication (NFC), or the like, or a combination thereof. Network 130 that may be described herein is not exhaustive and are not limiting. It should be noted that the above description about network 130 is merely provided for the purposes of illustration, and not intended to limit the scope of the present disclosure.

Imaging device 110 may include one or more devices that may scan one or more objects. For instance, the one or more devices may be used in, but not limited to, medical applications (e.g., a medical testing technology, etc.). In some embodiments, exemplary medical testing technologies may include magnetic resonance imaging (MRI), X-ray computed tomography (CT), positron emission computed tomography (PET), and single photon emission computed tomography (SPECT), or the like, or any combination thereof. In some embodiments, the object to be scanned may be an organ, an organism, a compound, a dysfunction, a tumor, or the like, or any combination thereof. In some embodiments, the object to be scanned may be the head, chest, bones, blood vessels of a human body, or the like, or any combination thereof. In some embodiments, imaging device 110 may include one or more imaging modules. The one or more imaging modules may include one or more detectors. The one or more detectors may be continuously placed around the object to be scanned.

In some embodiments, imaging device 110 and imaging processing device 120 may be connected to or communicated with each other. In some embodiments, imaging device 110 may transmit information to imaging processing device 120 via network 130. In some embodiments, imaging device 110 may directly transmit information to imaging processing device 120. In some embodiments, imaging processing device 120 may process information stored in itself.

Figure 1B:
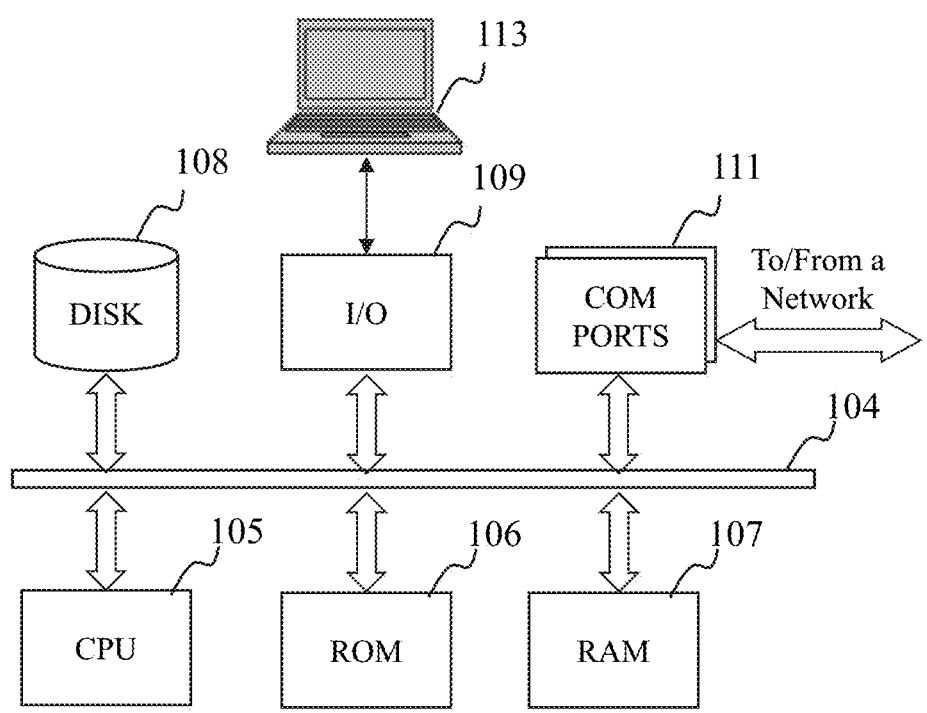
FIG. 1B illustrates an architecture of a computer on which a specialized system incorporating the present teaching may be implemented.

FIG. 1B illustrates an architecture of a computer 100b on which a specialized system incorporating the present teaching may be implemented. Such a specialized system incorporating the present teaching has a functional block diagram illustration of a hardware platform that may include user interface elements. Computer 100b may be a general purpose computer or a special purpose computer. Computer 100b may be used to implement any component of image processing as described herein. For example, image processing device 120 may be implemented on a computer such as computer 100b, via its hardware, software program, firmware, or a combination thereof. Although only one such computer is shown, for convenience, the computer functions relating to image processing as described herein may be implemented in a distributed fashion on a number of similar platforms, to distribute the processing load. In some embodiments, computer 100b may be used as imaging processing device 120 shown in FIG. 1.

Computer 100b, for example, may include communication (COM) ports 111 connected to and from a network connected thereto to facilitate data communications. Computer 100b may also include a central processing unit (CPU) 105, in the form of one or more processors, for executing program instructions. The exemplary computer platform may include an internal communication bus 104, program storage, and data storage of different forms, e.g., disk 108, read only memory (ROM) 106, or random access memory (RAM) 107, for various data files to be processed and/or communicated by the computer, as well as possibly program instructions to be executed by CPU 105. Computer 100b may also include an I/O component 109, supporting input/output flows between the computer and other components therein such as user interface elements 113. Computer 100b may also receive programming and data via network communications.

Aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of an image reconstruction system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as a main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution—e.g., an installation on an existing server. In addition, image processing as disclosed herein may be implemented as a firmware, firmware/software combination, firmware/hardware combination, or a hardware/firmware/software combination.

Figure 2:
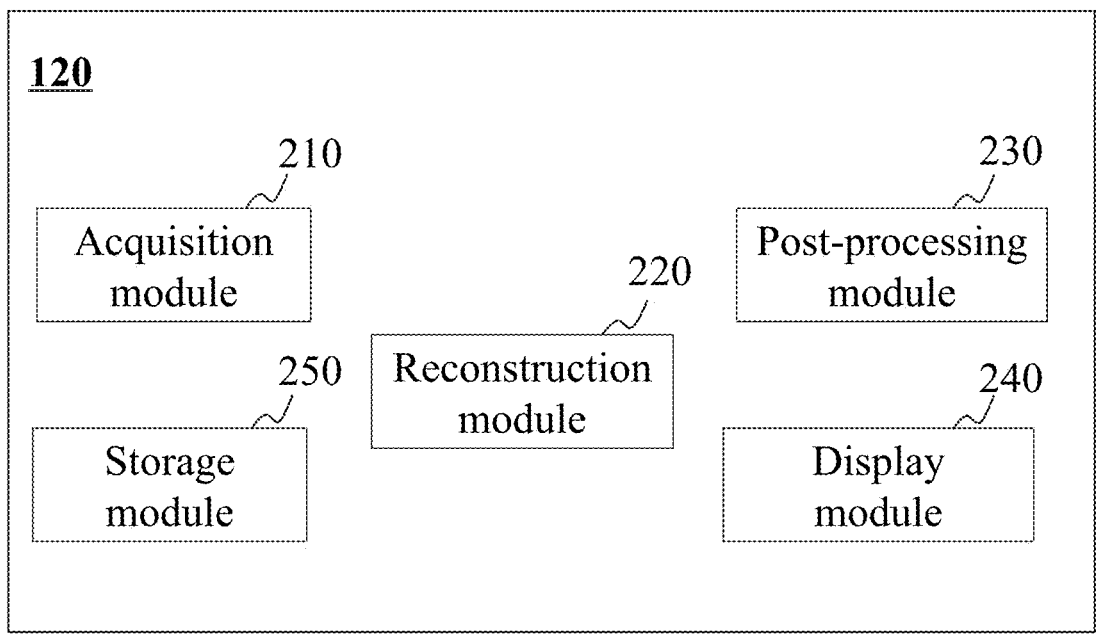
FIG. 2 is a block diagram of an imaging processing device according to some embodiments of the present disclosure.

FIG. 2 is a block diagram of an imaging processing device according to some embodiments of the present disclosure. Imaging processing device 120 may include an acquisition module 210, a reconstruction module 220, a post-processing module 230, a display module 240, and a storage module 250.

Acquisition module 210 may acquire information. The information may be acquired by scanning an object (e.g., scanning an object by imaging device 110), or be acquired from other source (e.g., storage module 250, network 130, etc.). The acquired information may include voxel data, voxel counts (or referred to as number of voxels), matrix, image, vector, vector database, or the like, or a combination thereof.

Reconstruction module 220 may reconstruct the information acquired by acquisition module 210. The information reconstruction may include generating an image matrix based on the acquired information. The image matrix may correspond to all or one or more parts of a scanned object.

In some embodiments, the information reconstruction may include determining one or more scanned regions and its corresponding one or more voxels. The one or more voxels may correspond to one or more elements in one or more image matrixes. The one or more image matrixes may be reconstructed iteratively based on the acquired information. In some embodiments, the iterative reconstruction of an image matrix may include performing one or more forward projections and/or one or more back projections. In some embodiments, the information reconstruction may include removing part of the information to improve calculation efficiency and/or storage efficiency. Merely by way of example, the information may be transformed into an image matrix. The image matrix may be compressed and/or rearranged to improve calculation efficiency and/or storage efficiency.

Post-processing module 230 may perform one or more post-processing operations on the reconstructed information generated by reconstruction module 220. In some embodiments, a reconstruction matrix based on one or more voxels may be post-processed to generate an image or an image matrix of all or one or more parts of a scanned object. The one or more post-processing operations of the image matrix may include filtering, noise reduction, merging, dividing, or the like, or a combination thereof.

Display module 240 may display an image generated by post-processing module 230. In some embodiments, display module 240 may include a display device (e.g., a display screen, etc.). In some embodiments, display module 240 may perform one or more processing operations on the image before displaying. The one or more processing operation may include image rendering, image scaling, image rotating, maximum intensity projection, or the like, or a combination thereof. In some embodiments, display module 240 may include an input devices. The input device may include a keyboard, a touch screen, a touchpad, a mouse, a remote control, or the like, or a combination thereof. In some embodiments, a user may input a parameter, and/or an initial condition for image displaying and/or image processing by the input device.

In some embodiments, a user may set a displaying parameter or process the image on display module 240. Merely by way of example, the user may choose the displayed content. The displayed content may include a two-dimensional image, a three-dimensional image, an image corresponding to scanned data, a control interface, an input interface, images of different regions, a process of image reconstruction, and a result of image reconstruction, or the like, or any combination thereof. As another example, the user may enlarge an image or a portion thereof, extract a portion of an image, and/or shrink an image.

Storage module 250 may store data. The stored data may be obtained from imaging device 110, network 130, and/or other modules or units of imaging processing device 120 (e.g., acquisition module 210, reconstruction module 220, post-processing module 230, display module 240, etc.). Storage module 250 may be any device that may store information. For example, storage module 250 may be a device that utilizes electrical energy to store information, such as a random access memory (RAM) or a read only memory (ROM). Storage module 250 may be a device that utilizes magnetic energy to store information, such as a hard disk, a floppy disk, a magnetic tape, a magnetic core memory, a bubble memory, a USB disk, a flash memory. Storage module 250 may be a device that utilizes optical energy to store information, such as CD or DVD, or the like. The access mode of storage module 250 may be random access, serial access storage, or read only storage, or the like, or any combination thereof. Storage module 250 may be a non-persistent memory or a permanent memory.

Storage module 250 may be connected with acquisition module 210, reconstruction module 220, post-processing module 230, display module 240, or other related modules. In some embodiments, storage module 250 may be connected with one or more virtual storage resources via network 130. The virtual storage resource may include a cloud storage, a virtual private network, and/or other virtual storage resources. The stored data may include various forms of data. The data may include a value, a signal, an image, a command, an algorithm, a program, or the like, or a combination thereof.

For persons having ordinary skills in the art, various modifications and changes in the forms and details of the application of the above method and system may occur without departing from the principles in the present disclosure. However, those variations and modifications also fall within the scope of the present disclosure. For example, the above modules may refer to different modules in a system, or one module may realize the function of two or more modules of the above modules. In some embodiments, storage module 250 may be contained in any one or more modules. In some embodiments, acquisition module 210 and display module 240 may form an input/output module. In some embodiments, reconstruction module 220 and post-processing module 230 may form an image generation module.

Figure 3:
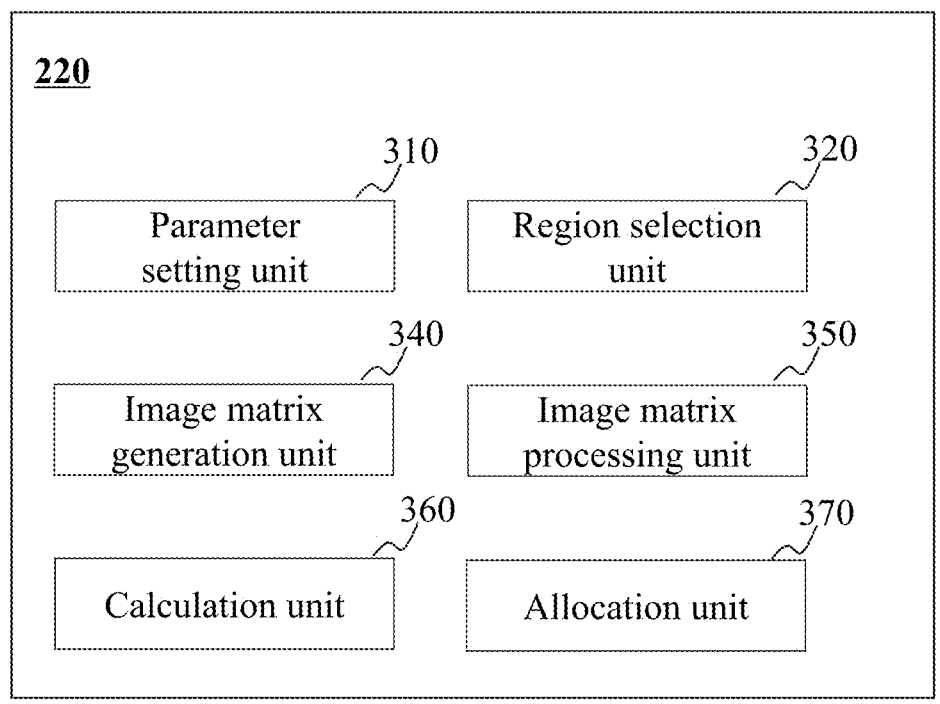
FIG. 3 is a block diagram of a reconstruction module according to some embodiments of the present disclosure.

FIG. 3 is a block diagram of a reconstruction module according to some embodiments of the present disclosure. Reconstruction module 220 may include a parameter setting unit 310, a region selection unit 320, an image matrix generation unit 340, an image matrix processing unit 350, a calculation units 360, a distribution units 370, or the like, or any combination thereof.

Parameter setting unit 310 may set a parameter in the process of reconstruction. The parameter may include the size of a reconstruction region, the position of the reconstruction region, the voxel size (or referred to as a size of a voxel) of the reconstruction region, the iterative algorithm to be used, and number of iterations, or the termination condition to stop iterations, or the like, or any combination thereof. In some embodiments, the parameter may be acquired from storage module 250. In some embodiments, a user may set the parameter via acquisition module 210 or display module 240. In some embodiments, a default value of the parameter may be stored in parameter setting unit 310. The default value may be used when the parameter is not set.

Region selection unit 320 may select a reconstruction region. The reconstruction region may be selected by selecting size and/or position of the reconstruction region. In some embodiments, region selection unit 320 may acquire one or more parameters about the size and/or position of the reconstruction region from parameter setting unit 310. In some embodiments, region selection unit 320 may store default parameter(s) about one or more scanned parts (e.g., a head cavity, a chest cavity, an abdominal cavity, etc.). The default parameter(s) may be acquired or adjusted. In some embodiments, region selection unit 320 may be combined with display module 240. For instance, a user may select a region to be scanned and/or to be reconstructed in the image displayed by display module 240. Region selection unit 320 may scan or reconstruct the selected region.

Image matrix generation unit 340 may generate one or more image matrixes. The one or more image matrixes may correspond to one or more scanned regions. In some embodiments, there is a one-to-one correspondence between the image matrix and the scanned region. In some embodiments, one element in the image matrix may correspond to one voxel size in the scanned region. The voxel size may include an X-ray attenuation coefficient, a gamma-ray attenuation coefficient, a hydrogen atom density, or the like, or any combination thereof. In some embodiments, the voxel size may be modified and/or updated in the process of iterative reconstruction. In some embodiments, the voxel size may be converted into the gray scale or RGB chroma of an image. For example, the image matrix may correspond to an image and/or be converted into an image.

Image matrix processing unit 350 may perform a processing operation on an image matrix. The processing operation may include dividing an image matrix into a plurality of sub-image matrixes, image matrix rotation, image matrix, image matrix compression, image matrix decompression, image matrix rearrangement, image matrix inverse rearrangement, image matrix filling, image matrix merging, or the like, or any combination thereof. The image matrix rotation may include rotating an image matrix clockwise or counterclockwise.

The image matrix compression may include removing one or more elements from the image matrix. In some embodiments, the voxel corresponding to the removed element may be not penetrated by one or more rays (e.g., one or more lines of response in a PET system, x-rays in a CT system, etc.). The value of the removed element may be set to zero or another fixed value in image reconstruction. In some embodiments, the removed element may be an element that satisfy one or more conditions. For example, the removed element may be an element whose value is below a threshold, or that is located at a certain position in the matrix.

The image matrix decompression may include adding one or more elements into the image matrix. In some embodiments, one or more elements that are removed in image matrix compression may be added back to their original positions. In some embodiments, the value of the element may remain the same in image matrix compression or image matrix decompression.

The image matrix rearrangement may include moving an element of an image matrix from a first position to a second position in the image matrix. In some embodiments, the element(s) with a certain characteristic may be arranged to a certain position or area including a cluster of positions. Correspondingly, the inverse image matrix rearrangement may include moving all or a portion of the moved elements back to the original position(s). In some embodiments, the value of the element may remain the same when it is arranged or rearranged.

The image matrix filling may include filling a null element in an image matrix with a value according to a certain rule or algorithm. Merely by way of example, in a PET system, an element in an image matrix that corresponds to a voxel penetrated by a line of response may be filled based on the position of the voxel. In some embodiments, the image matrix filling may be performed according to the counts of detectors along a line of response and the effect of the voxels being penetrated by the line of response on the counts of detectors. As another example, in a computed tomography system, an element in an image matrix that corresponds to a voxel penetrated by an X-ray may be filled based on the position of the voxel.

The image matrix division may include dividing an image matrix into a plurality of sub-image matrixes. In some embodiments, a sub-image matrix may include a portion of the elements in the divided image matrix. In some embodiments, a sub-image matrix may include a scanned region that is penetrated by one or more lines of response. Similarly, a line of response may penetrate one or more scanned regions corresponding to one or more sub-image matrixes.

The image matrix merging may include merging a plurality of sub-image matrixes into an image matrix. In some embodiments, an image matrix may be divided into a plurality of sub-image matrixes for processing, and then the plurality of sub-image matrixes may be merged back into the image matrix.

Calculation unit 360 may calculate element values in an image matrix as well as other values. In some embodiments, calculation unit 360 may calculate element values in an image matrix corresponding to a scanned region penetrated by one or more lines of response, and the calculation may be performed based on the counts of detectors along the one or more lines of response. In some embodiments, calculation unit 360 may include a main computing node and one or more subordinate computing nodes. In some embodiments, each of the one or more subordinate computing nodes may generate a sub-image matrix corresponding to a sub-scanned region. The sub-scanned region may be scanned by one or more detectors. In some embodiments, the subordinate computing node may compute the values of the elements in the sub-image matrix corresponding to a sub-scanned region based on the counts of detectors corresponding to the sub-scanned region. In some embodiment, the main computing node may merge the values of the elements in different sub-image matrixes corresponding to a voxel in a sub-scanned region. For example, a voxel may correspond to a plurality of sub-image matrixes. The values of the elements in the plurality of sub-image matrixes corresponding to the voxel may be respectively computed by the subordinate computing nodes. The main computing node may merge the values of the elements in the plurality of sub-image matrixes to determine the size of the voxel.

Allocation unit 370 may distribute computational tasks to different computing nodes of calculation unit 360. The computing nodes may include one or more main computing nodes and one or more subordinate computing nodes. In some embodiments, allocation unit 370 may match or group detectors and determine the size and position of a sub-scanned region corresponding to detector pairs or detector groups. In some embodiments, allocation unit 370 may distribute the computational tasks of the sub-image matrixes to different subordinate computing nodes.

For persons having ordinary skills in the art, multiple variations and modifications to reconstruction module 220 may be made without departing from the principles of the system and method for image reconstruction in the present disclosure. However, those variations and modifications also fall within the scope of the present disclosure. For example, in some embodiments, image matrix generation unit 340 and image matrix processing unit 350 may form an image matrix unit. In some embodiments, reconstruction module 220 may not include calculation unit 360 and the function of calculation unit 360 may be realized by other units.

Figure 4:
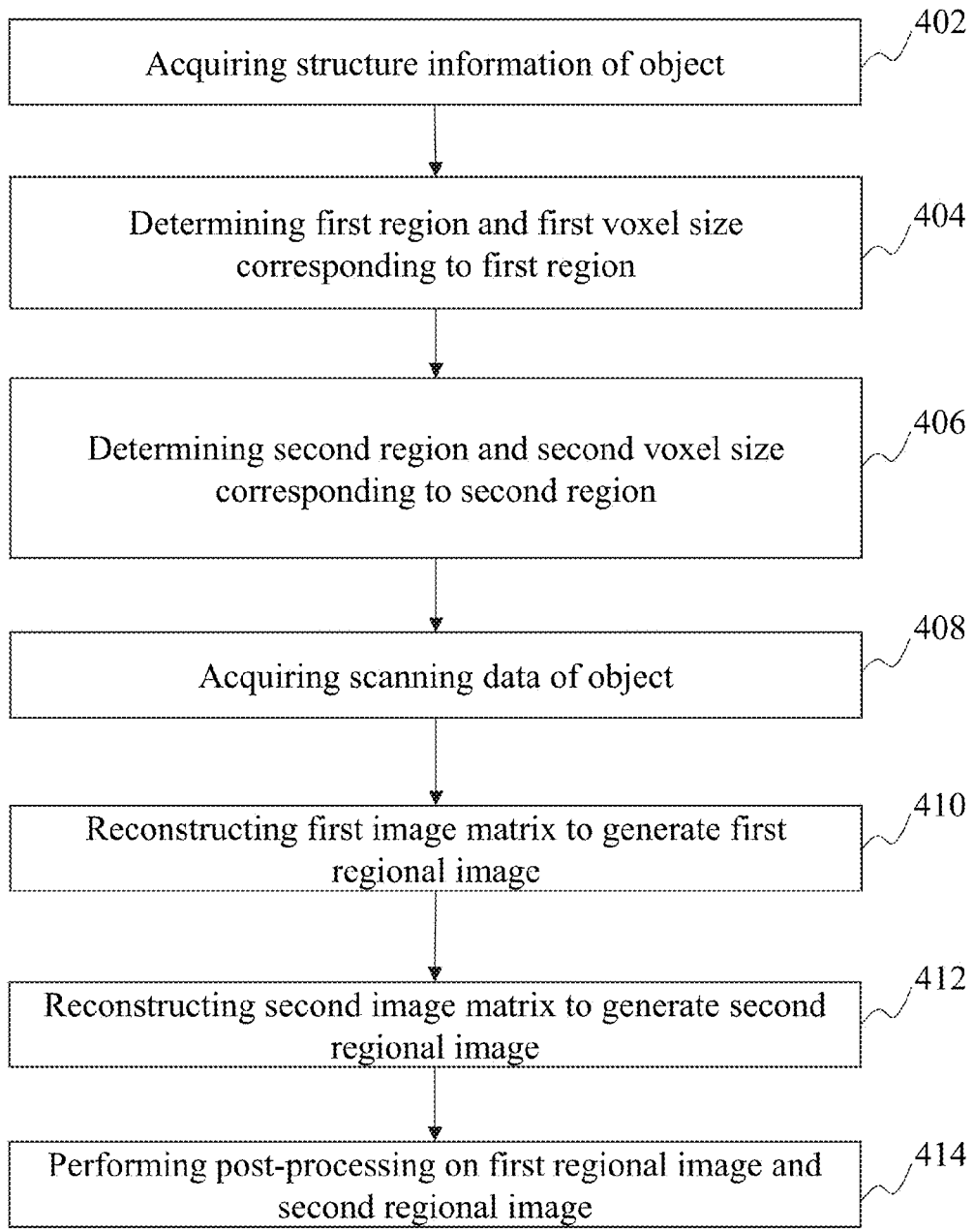
FIG. 4 is a flowchart illustrating an exemplary process for image reconstruction according to some embodiments of the present disclosure.

FIG. 4 is a flowchart illustrating an exemplary process for image reconstruction according to some embodiments of the present disclosure. In some embodiments, process 400 may be performed by imaging processing device 120. In some embodiments, at least part of process 400 may be performed by computer 100b shown in FIG. 1B. As shown in FIG. 4, in 402, imaging processing device 120 may acquire structural information of an object. For example, the structural information may include information about the outline or appearance of the object. In some embodiments, 402 may be performed by acquisition module 210. For example, the structural information may be acquired by scanning the object. The scanning may be performed by a CT system, an MR system, or a PET system, etc.

In 404, a first region and a size of first voxel corresponding to the first region may be determined according to the structural information of the object. Operation 404 may be performed by acquisition module 210. In some embodiments, the first region may correspond to the entire object. In some embodiments, the size of the first voxel may be stored in a first image matrix $M_0$ as a first element.

In 406, a second region and a size of second voxel corresponding to the second region may be determined according to the structural information of the object. Operation 406 may be performed by acquisition module 210. In some embodiments, the second region may correspond to a portion of the object. In some embodiments, the size of the second voxel may be stored in a second image matrix $M_1$ as a second element. In some embodiments, the size of the second voxel may be smaller than the size of the first voxel. In some embodiments, the second region may correspond to the region that needs to be imaged with high resolution.

In 408, imaging processing device 120 may acquire scan information of the object. For example, imaging processing device 120 may acquire scan information by imaging device 110. In some embodiments, imaging device 110 may include a PET device. As another example, the scan information may be acquired from storage module 250. As a further example, the scan information may be acquired from a remote storage module (e.g., a cloud disk) via network 130.

After acquiring scan information of the object, imaging processing device 120 may reconstruct the first image matrix $M_0$ to generate a first regional image in 410, and reconstruct the second image matrix $M_1$ to generate a second regional image in 412. In some embodiments, the first image matrix $M_0$ and the second image matrix $M_1$ may be reconstructed based on an iterative reconstruction algorithm.

Merely by way of examples, the first image matrix $M_0$ and the second image matrix $M_1$ may be reconstructed based on an Ordered Subset Expectation Maximization (OSEM) algorithm. The OSEM algorithm may be performed according to Equation (1) below:

$$f_{jm}^{(n+1)} = f_{jm}^{(n)} \cdot B(y_i, F), \tag{1}$$

wherein i is a serial number of a line of response (i.e., detector pair), m is a serial number of an image matrix to be reconstructed, j is a serial number of an element in the image matrix m, $f_{jm}^{(n)}$ is a value of the element j in the image matrix m at the $n^{th}$ iteration, $y_i$ is the number of the lines of response i, F is a forward projection coefficient, $B(y_i, F)$ is a back projection coefficient.

In some embodiments, the OSEM algorithm may include one or more operations. The one or more operations may include performing a forward projection on an image matrix (e.g., performing a forward projection on the voxel corresponding to an element in an image matrix), calculating a correction coefficient, performing a back projection on an image matrix (e.g., performing a back projection on the voxel corresponding to an element in an image matrix), updating an image matrix, etc. More descriptions regarding the one or more operations may be found elsewhere in the present disclosure. See, e.g., FIG. 11 and FIG. 12 and the description thereof.

In some embodiments, the first image matrix $M_0$ may be reconstructed to generate a first regional image. The reconstruction of the first image matrix $M_0$ may include a forward projection of the first voxel and the second voxel, and a back projection of the first voxel. The second image matrix $M_1$ may be reconstructed to generate an image of a second regional image. The reconstruction of the second image matrix $M_1$ may include a forward projection of the first voxel and the second voxel, and a back projection of the second voxel. In some embodiments, the sizes of the first voxel and the second voxel may be different or the same.

A forward projection may be performed on an image matrix to generate a detection result of a detector. In some embodiments, a forward projection coefficient may be determined according to Equation (2) below:

$$F = \Sigma_m \Sigma_k c_{ikm} f_{km}^{(n)}, \tag{2}$$

wherein k is a serial number of element related to the line of response i in the image matrix m, and $c_{ikm}$ represents the sensitivity of the line of response i to the element j in the image matrix m. In some embodiments, different image matrixes may correspond to different voxel sizes. For example, a line of response may penetrate a first region corresponding to a first voxel and a second region corresponding to a second voxel. The forward projection on the image matrix may include a forward projection of the first voxel and a forward projection of the second voxel according to the Equation (2).

A correction coefficient may be calculated. The correction coefficient may be a ratio of the number of lines of response to a forward projection value of the reconstructed image along the line of response, i.e.

$$\frac{y_i}{F}.$$

A back projection may be performed based on the correction coefficient to update the image matrix. The back projection may be performed according to Equation (3) below: as the formula below:

$$B_m(y_i, F) = \frac{1}{\sum_i \sum_k c_{ikm}} \sum_i \sum_k c_{ikm} \frac{y_i}{F}, \tag{3}$$

In some embodiments, the numbers of iterations of different images corresponding to different image matrixes may be different. For example, to reconstruct an image matrix of the body of a patient, the iteration may be performed twice. As another example, to reconstruct an image matrix of the brain of the patient, the iteration may be performed for four times.

A predetermined number of iterations performed to reconstruct an image matrix may be denoted as d(m), wherein m is a serial number of the image matrix number. m may be integer equal to or greater than 0. The Equation (3) and Equation (1) may be rewritten as Equation (4) and Equation (5) below, respectively:

$$B(y_i, F) = \begin{cases} B_m(y_i, F) & d(m) > n \\ 1 & d(m) \le n \end{cases}, \tag{4}$$

and $$f_{jm}^{(n+1)} = f_{jm}^{(n)} \cdot B(y_i, F), \, d(m) \ge n, \tag{5}$$

wherein n is the current iteration number. If the predetermined number of iterations is greater than the current iteration number n, the image matrix may be processed and thereby updated during the next iteration. If the predetermined number of iterations is less than or equal to the current iteration number n, the iteration may be stopped and the image corresponding to the current image matrix may be output.

After acquiring the first image matrix $M_0$ and the second image matrix $M_1$, imaging processing device 120 may convert the first image matrix $M_0$ into a first regional image and the second image matrix $M_1$ into a second regional image based on the value of an element in the image matrix. The value of an element in the image matrix may be (e.g., converted into) the gray scale or RGB chroma of the voxel in the image. Imaging processing device 120 may then perform a post-processing operation on the first regional image and the second regional image. More descriptions regarding the post-processsing operation may be found elsewhere in the present disclosure. See, e.g., FIG. 6A and FIG. 6B, and the description thereof.

Figure 5:
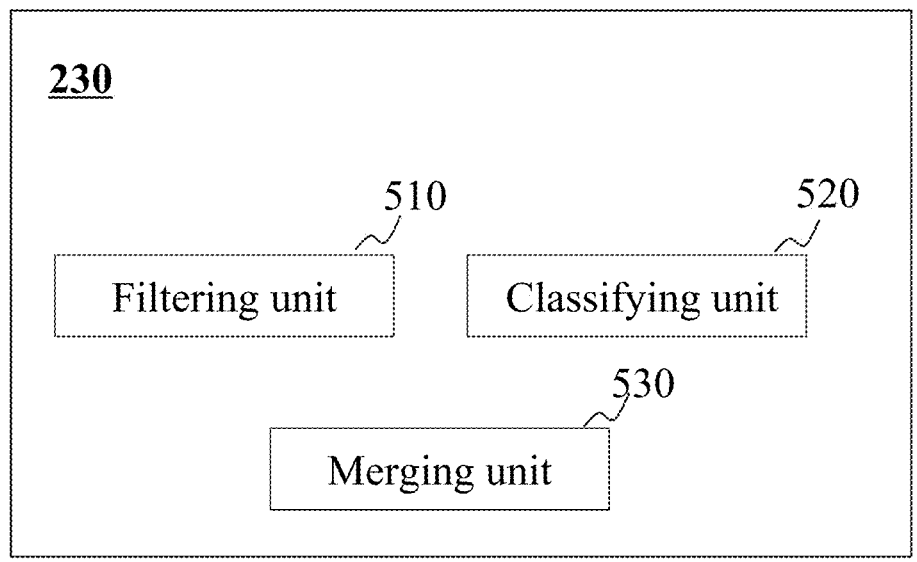
FIG. 5 is a block diagram of a post-processing module according to some embodiments of the present disclosure.

FIG. 5 is a block diagram of a post-processing module according to some embodiments of the present disclosure. Post-processing module 230 may include a filtering units 510, a classifying units 520, and a merging units 530.

Filtering unit 510 may be configured to filter an image matrix, or the data, or image corresponding to the image matrix, etc. The filtering operation may be performed based on one or more filtering algorithm. The filtering algorithm may include a Gaussian filtering algorithm, a Metz filtering algorithm, a Butterworth filtering algorithm, a Hamming filtering algorithm, a Hanning filtering algorithm, a Parzen filtering algorithm, a Ramp filtering algorithm, a Shepp-logan filtering algorithm, a Wiener filtering algorithm, or the like, or a combination thereof. In some embodiments, different scanned region or different parts of a scanned object may be filtered based on different filtering algorithms. For example, the Metz filtering algorithm may be applied in brain scanning, and the Gaussian filtering algorithm may be applied in body scanning.

Classifying unit 520 may store one or more filtered image matrixes in different matrixes based on the voxel sizes of the one or more filtered image matrixes. In some embodiments, the filtered image matrixes that have the same or similar voxel sizes may be stored in the same matrixes.

Merging unit 530 may merge a plurality of image matrixes corresponding to different physical regions with different voxel sizes. In the some embodiments, a merged matrix may be generated in the merging of image matrixes. For example, the merged matrix may correspond to the largest region of the regions corresponding to the image matrixes to be merged. As another example, the voxel size of the merged matrix may equal to the least voxel size of the voxel sizes corresponding to the image matrixes to be merged. In some embodiments, the smaller voxel size, the higher the resolution is. In some embodiments, the image matrixes to be merged may be interpolated to generate a high-resolution image. The interpolation of the image matrixes may include estimating a size of a voxel that is null in the high-resolution image when a low-resolution image is converted to a high-resolution image based on an interpolation algorithm. Exemplary interpolation algorithm may include a bilinear interpolation algorithm, a bi-cubic interpolation algorithm, a fractal interpolation algorithm, a natural neighbor interpolation algorithm, a nearest neighbor interpolation algorithm, a minimum curvature algorithm, a local polynomial regression algorithm, or the like, or a combination thereof.

Figure 6A:
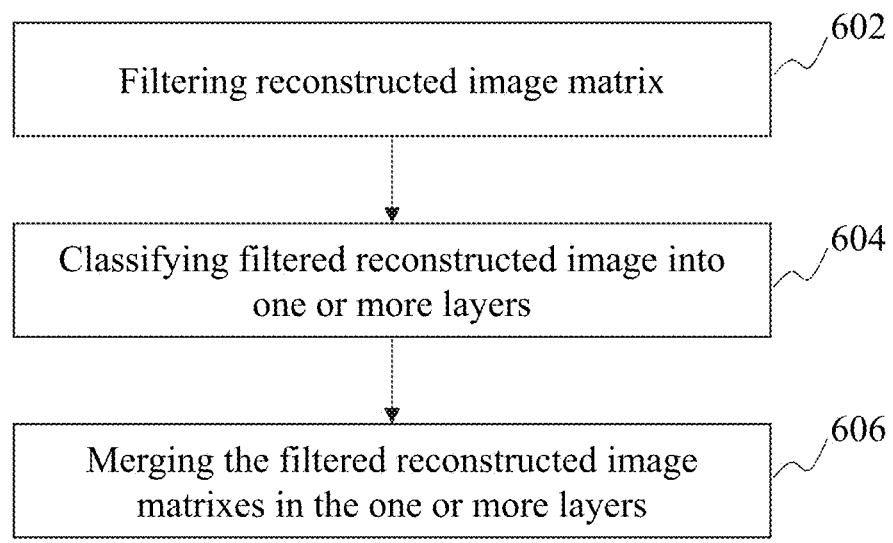
FIG. 6A is a flowchart illustrating an exemplary process for post-processing according to some embodiments of the present disclosure.
Figure 6B:
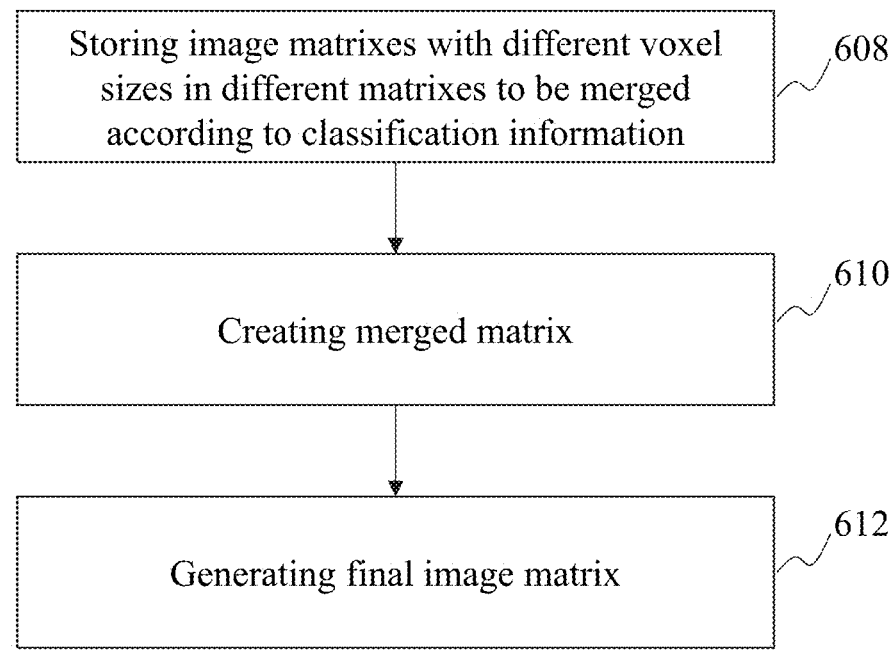
FIG. 6B is a flowchart illustrating an exemplary process for post-processing according to some embodiments of the present disclosure.

FIG. 6A and FIG. 6B are two flowcharts illustrating exemplary processes for post-processing according to some embodiments of the present disclosure. Process 600a and process 600b may be performed by post-processing module 230. As shown in FIG. 6A, in 602, a reconstructed image matrix may be filtered. The filtering of the reconstructed image matrix may be performed based on the Gaussian filtering algorithm, the Metz filtering algorithm, the Butterworth filtering algorithm, the Hamming filtering algorithm, the Hanning filtering algorithm, the Parzen filtering algorithm, the Ramp filtering algorithm, the Shepp-logan filtering algorithm, the Wiener filtering algorithm, or the like, or a combination thereof. In some embodiments, different scanned region or different parts of a scanned object may be filtered based on different filtering algorithms. For example, the Metz filtering algorithm may be applied to a brain scan, and the Gaussian filtering algorithm may be applied to a body scan.

In 604, the filtered reconstructed image matrixes may be classified into one or more layers. For example, the image matrixes may be classified according to voxel sizes of the image matrixes. In some embodiments, the classified image matrixes may be stored in a DICOM file. The DICOM file may record the image matrixes, the classification information of the image matrixes, and the values of voxels of the image matrixes. In some embodiments, the classification information of an image matrix may include its voxel size. Merely by way of example, the image matrixes may be classified into two layers, a first layer (or a higher layer) and a second layer (or a lower layer); the lower layer may include a lower voxel size than the higher layer.

In 606, the filtered reconstructed image matrixes in different layers may be merged. The classification information of the image matrixes may be recorded in the DICOM file. The image matrixes in different layers may be stored in different matrixes. The image matrixes may be merged to form a merged image matrix based on its classification information. In some embodiments, the merging of image matrixes may be performed according to process 600b as illustrated in FIG. 6B.

In 608, post-processing module 230 may store image matrixes with different voxel sizes into different matrixes to be merged according to classification information. In some embodiments, a physical region may correspond to a plurality of matrixes to be merged. The plurality of matrixes to be merged may have different voxel sizes. The images that correspond to two or more image matrixes to be merged may at least partially overlap or do not overlap at all.

In 610, post-processing module 230 may create a merged matrix M. The physical region corresponding to the merged matrix M may be the largest region of the physical regions corresponding to the image matrixes to be merged. In some embodiments, the voxel size of the merged matrix M may be the smallest voxel of the voxel sizes of the image matrixes to be merged. In some embodiments, the smaller the voxel size, the higher the resolution is.

In 612, post-processing module 230 may generate a final image matrix after the determination of the merged matrix M and its corresponding physical region and the voxel size. All or parts of the matrix whose corresponding physical region is smaller than the largest physical region of the image matrixes to be merged may be filled by zeroes. For instance, the matrix whose corresponding physical region is smaller than the largest physical region of the image matrixes to be merged may be extended from its original form to match the largest physical region. At least a portion of the image matrix that is extended may be filled by zeroes. In some embodiments, matrixes whose voxel sizes are greater than the smallest voxel size of matrixes to be merged may be interpolated by post-processing module 230. The interpolation of the matrixes may include estimating a size of the voxel that is null in the high-resolution image when a low-resolution image is converted to a high-resolution image based on an interpolation algorithm. The interpolation algorithm may include a bilinear interpolation algorithm, a bi-cubic interpolation algorithm, a fractal interpolation algorithm, a natural neighbor interpolation algorithm, a nearest neighbor interpolation algorithm, a minimum curvature algorithm, a local polynomial regression algorithm, or the like, or a combination thereof.

Post-processing module 230 may merge the filled and/or interpolated image matrixes to form a final matrix M. In some embodiments, the image matrixes to be merged may be classified into one or more layers. For example, the image matrixes to be merged may be classified into L layers. Image matrixes in the first layer, image matrixes in the second layer, . . . image matrixes in the $L^{th}$ layer may be filled into the matrix M successively.

Merely by way of example, image matrix A may be classified into layer X and image matrix B may be classified into layer Y. Y may be larger than X. In some embodiments, image matrixes may be classified according to its voxel sizes. The voxel size of image matrix B in layer Y is smaller than the voxel size of image matrix A in layer X. If the physical region corresponding to image matrix A and the physical region corresponding to image matrix B do not overlap, the element values of the two image matrixes may be respectively filled into the matrix M. If the physical region corresponding to image matrix A and the physical region corresponding to image matrix B at least partially overlap with each other, the element values of the matrix B may be filled into the matrix M.

Figure 7A:
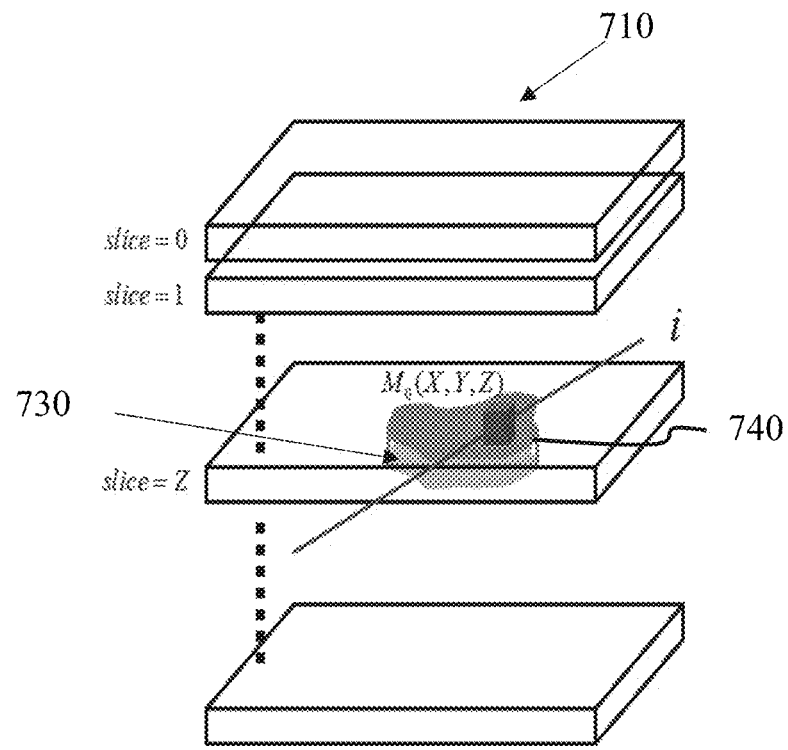
FIG. 7A and FIG. 7B are schematic diagrams illustrating a correlation between voxels and matrixes according to some embodiments of the present disclosure.
Figure 7B:
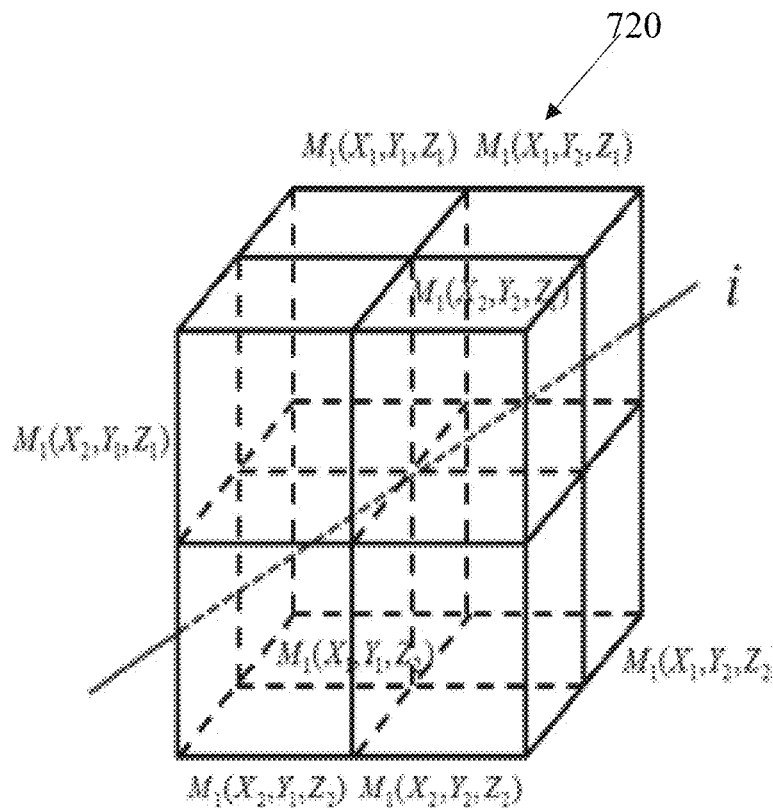

FIG. 7A and FIG. 7B are schematic diagrams illustrating a correlation between voxels and matrixes according to some embodiments of the present disclosure. In some embodiments, the correlation between image matrixes and voxels may be recorded in a lookup table. As shown in FIG. 7A and FIG. 7B, $M_0$ and $M_1$ are two image matrixes. Voxel 740 in $M_0$ may correspond to eight voxels 720 in $M_1$. The voxel size of image matrix $M_1$ is smaller than the voxel size of image matrix $M_0$. In some embodiments, region 730 may be covered by the region corresponding to the image matrix $M_0$ and the region corresponding to the image matrix $M_1$.

The contribution of the voxel 740 in $M_0$ to the number of lines of response i may be calculated based on the contribution of the eight voxels 720 in $M_1$ to the number of lines of response i. The eight voxels 720 in $M_1$ may correspond to voxel 740 in $M_0$. The eight voxels 720 may be determined based on a lookup table (LUT). The lookup table may record the correlation between the voxels in one or more image matrixes.

For example, the lookup table may record a correlation between voxel 740 (i.e., $M_0(X, Y, Z)$) and eight voxels 720 (i.e., $M_1(X_1, Y_1, Z_1)$, $M_1(X_1, Y_2, Z_1)$, $M_1(X_2, Y_1, Z_1)$, $M_1(X_2, Y_2, Z_1)$, $M_1(X_1, Y_1, Z_2)$, $M_1(X_1, Y_2, Z_2)$, $M_1(X_2, Y_1, Z_2)$, $M_1(X_2, Y_2, Z_2)$).

In some embodiments, image matrixes $M_0$ and $M_1$ may be classified into different layers based on their voxel values. The correlation between the image matrixes in different layers recorded in the lookup table may be determined according to the position relationship between the image regions of the image matrixes.

In some embodiments, the lookup table may record rearrangement information of an image matrix. For example, the lookup table may record the correlation between the compressed and/or rearranged voxels and the elements in the image matrix $M_0$.

Figure 8:
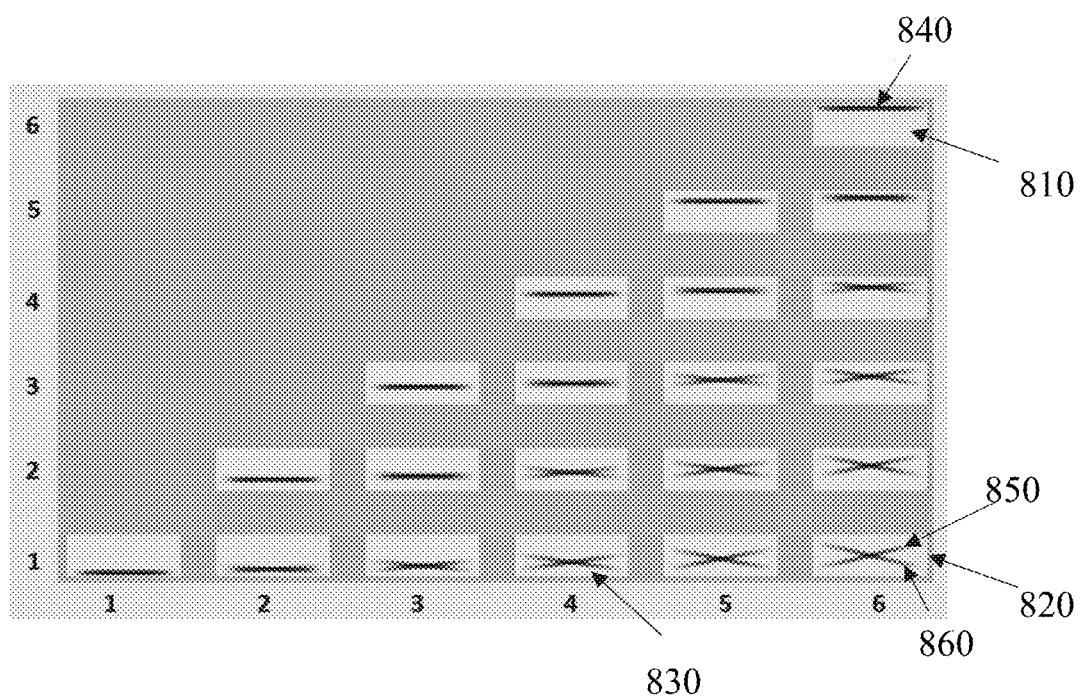
FIG. 8 is a schematic diagram illustrating a match between imaging modules according to some embodiments of the present disclosure.

FIG. 8 is a schematic diagram illustrating a matching of imaging modules according to some embodiments of the present disclosure. In some embodiments, imaging device 110 may include one or more imaging modules. One or more detectors of the one or more imaging modules may be placed continuously around the imaged object. Merely by way of examples, the imaging module may correspond to a PET detector. More descriptions regarding the position arrangement of detectors may be found elsewhere in the present disclosure. See, e.g., FIG. 10A to FIG. 10C and the description thereof.

As shown in FIG. 8, the imaging device 110 may include six imaging modules. The six imaging modules may be paired to form twenty one imaging module pairs including imaging module pair 810, imaging module pair 820, and imaging module pair 830. Imaging module pair 810 may be a pair including a sixth imaging module and a sixth imaging module. A line of response may be received by the detectors of the sixth imaging module. Imaging module pair 820 may be a pair including a first imaging module with a sixth imaging module. A line of response may be received by the detectors corresponding to the first imaging module and the sixth imaging module. Imaging module pair 830 may be a pair including a first imaging module with a fourth imaging module. A line of response may be received by the detectors corresponding to the first imaging module and the fourth imaging module. In some embodiments, the computational tasks of each imaging module pair may be processed by the subordinate computing node(s) described in elsewhere in the present disclosure. In some embodiments, the computational tasks of each module pair may be performed by a subordinate compute node. The computation results of one or more subordinate computing nodes may be summarized by one or more main computing node.

As shown in FIG. 8, a black portion, such as the "x" shape or "−" shape in a rectangular box, may correspond to an element in an image matrix to be modified in the matching of the imaging modules. More descriptions regarding the element modification may be found elsewhere in the present disclosure. See, e.g., FIG. 10A to FIG. 10C and the description thereof. In some embodiments, an image matrix may be compressed and/or rearranged based on the element that needs to be modified to reduce the storage and amount of calculation of a pair of imaging modules. For example, the elements below the black line 840 in imaging module pair 810 may be removed. As another example, the elements in the black line 850 and black line 860 in imaging module pair 820 may be moved together, and then the rest elements except black line 850 and black line 860 in imaging module pair 820 may be removed.

Figure 9:
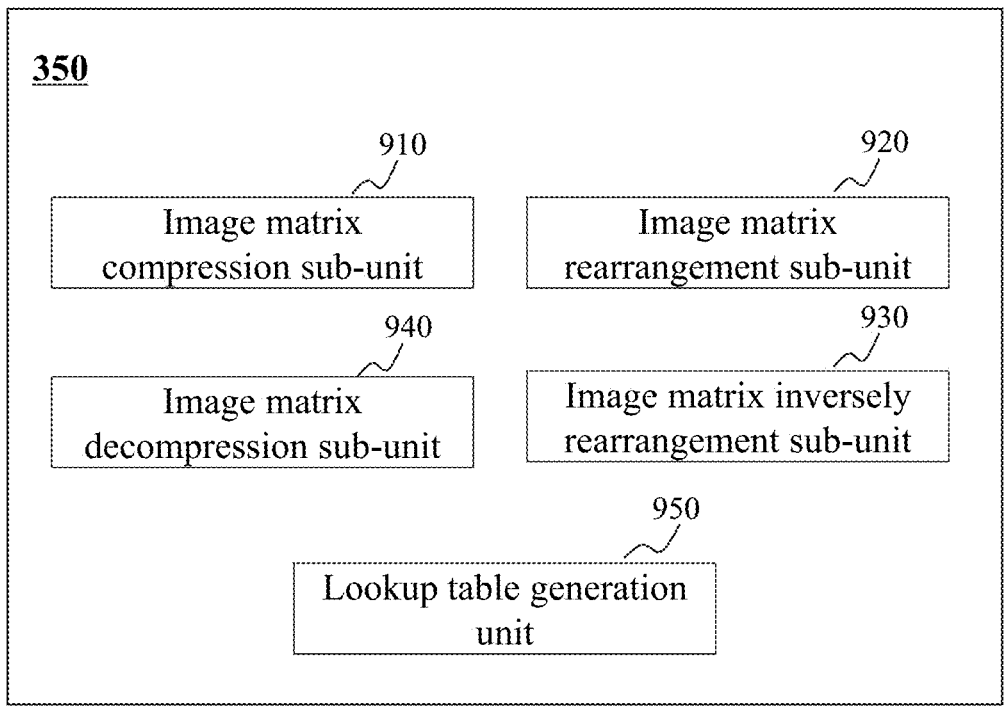
FIG. 9 is a block diagram of an image matrix processing unit according to some embodiments of the present disclosure.

FIG. 9 is a block diagram of an exemplary image matrix processing unit according to some embodiments of the present disclosure. Image matrix processing unit 350 may include an image matrix compression sub-unit 910, an image matrix rearrangement sub-unit 920, an image matrix inversely rearrangement sub-unit 930, an image matrix decompression sub-unit 940, and a lookup table generation sub-unit 950.

Image matrix compression sub-unit 910 may compress an image matrix. For example, one or more elements may be removed in image matrix compression. In some embodiments, the removed element may be null. In a PET system, a null element may correspond to a voxel that is not penetrated by a line of response, or a voxel that does not contribute to a count of a detector in the process of image reconstruction (e.g., forward projection, back projection, etc.). In some embodiments, the removed element may satisfy one or more conditions. For example, the removed element may be an element whose value is below a threshold. As another example, the the removed element may be an element that is located in a certain position in a matrix (e.g., a position that may not effect image reconstruction or other operations, etc.). Examples of such positions include a table that supports a patient in a scan.

Image matrix rearrangement sub-unit 920 may move an element in an image matrix from a first position to a second position. An element with a certain characteristic may be rearranged. For example, non-zero elements in an image matrix may be moved and gathered. In some embodiments, the element originally at the second position may be removed before the image matrix rearrangement. In some embodiments, the element originally at the second position may be moved to the first position.

Image matrix inversely rearrangement sub-unit 930 may move all or a portion of the moved elements to their original positions before the rearrangement. In some embodiments, the value of an element in an image matrix may remain the same when it is rearranged or inversely rearranged.

Image matrix decompression sub-unit 940 may add one or more elements into an image matrix. In some embodiments, one or more elements that are removed from an image matrix compression may be added back to their original positions. In some embodiments, the value of an element may remain the same in image matrix compression and/or image matrix decompression.

Lookup table generating sub-unit 950 may create a lookup table. The lookup table may record position information about image matrix rearrangement, and/or correlation between the elements in one or more image matrixes. For example, the lookup table may record image matrixes in different layers as shown in FIG. 7A and FIG. 7B, and the correlation between elements in image matrixes in different layers and image regions.

For persons having ordinary skills in the art, multiple variations and modifications in form and detail may be made without departing from the principles in the present disclosure. However, those variations and modifications also fall within the scope of the present disclosure. For example, lookup table generating sub-unit 950 and image matrix rearrangement sub-unit 920 may form a sub-unit that may perform the function of the two sub-units.

Figure 10A:
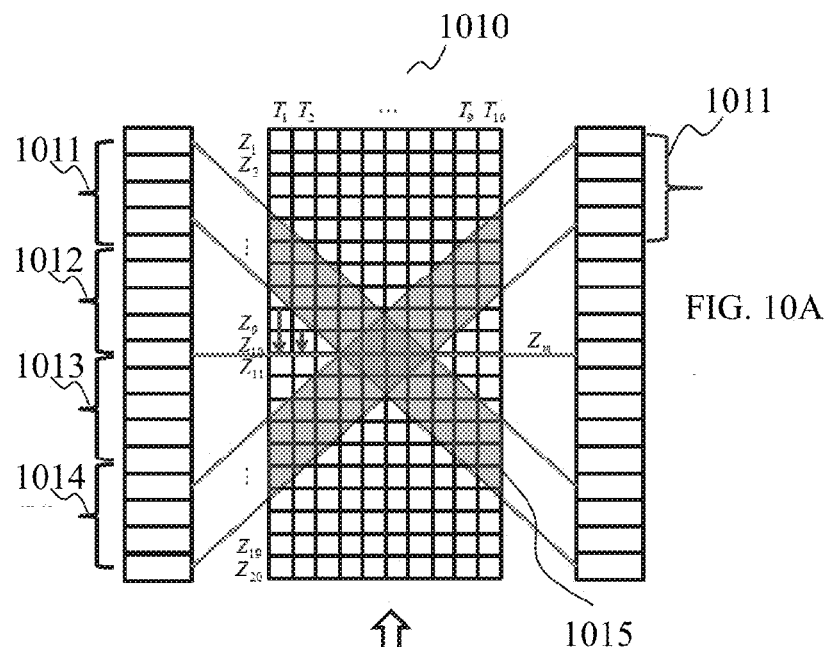
FIG. 10A, FIG. 10B, and FIG. 10C are schematic diagrams illustrating an exemplary process for processing an image matrix according to some embodiments of the present disclosure.
Figure 10B:
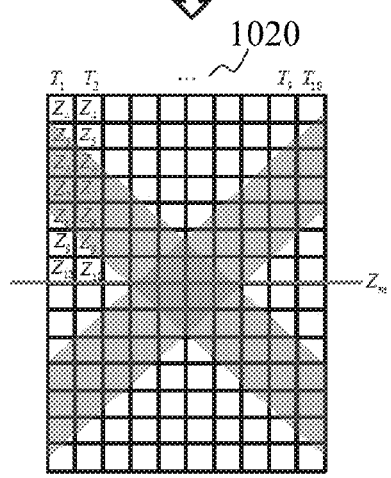
Figure 10C:
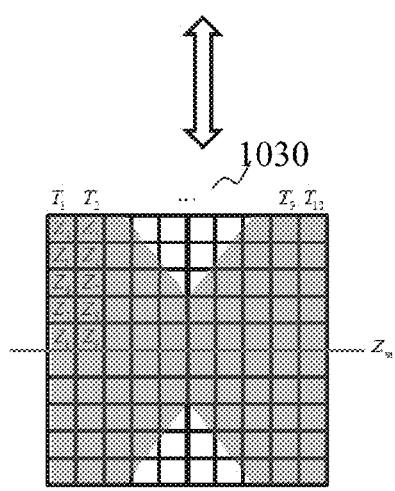

FIG. 10A, FIG. 10B, and FIG. 10C are schematic diagrams illustrating an exemplary process for processing an image matrix according to some embodiments of the present disclosure. Image matrix 1010 may correspond to a scanned region. The scanned region may be determined by a first imaging module 1011, a second imaging module 1012, a third imaging module 1013, and a fourth imaging module 1014. First imaging module 1011 and fourth imaging module 1014 may be paired. First imaging module 1011 may correspond to a first detector. Fourth imaging module 1014 may correspond to a fourth detector.

In some embodiments, a subordinate computing node may be used to process the computational tasks of the first imaging module and the fourth imaging module. The subordinate computing node may determine the lines of response which can be received by the detectors of the first imaging module and the fourth imaging module. As shown in FIG. 10A, the shaded portion 1015 in the image matrix 1010 may correspond to an element that needs to be updated and calculated in reconstruction after the matching of first imaging module 1011 and fourth imaging module 1014. The value of the rest elements in image matrix 1010 may remain the same in matrix reconstruction.

In some embodiments, the image matrix 1010 may be compressed into an image matrix 1020 as illustrated in FIG. 10B. For example, the elements in the upper and lower portions of image matrix 1010 whose values remain the same in the image matrix reconstruction may be removed. Merely by way of example, elements $Z_1$, $Z_2$, $Z_3$, $Z_{18}$, $Z_{19}$, and $Z_{20}$ may be removed.

In some embodiments, image matrix 1020 may be rearranged and compressed into image matrix 1030 as illustrated in FIG. 10C. For example, elements in the image matrix 1020 whose values have been changed in the image matrix reconstruction may be moved and gathered. For example, elements in every T-dimension in the image matrix 1020 may be processed. For example, elements $(T_1, Z_9)$, $(T_1, Z_{10})$, $(T_1, Z_{11})$, $(T_1, Z_{12})$ in the image matrix 1020 may be removed, and the rest elements in $T_1$ may be moved. In some embodiments, the element to be removed and its moving direction and position may be determined according to a lookup table.

As shown in FIG. 10A through FIG. 10C, image matrix 1010 (10×20) is compressed and rearranged into the image matrix 1030 (10×10) to reduce the storage and amount of calculation. The compression and rearrangement of the image matrix may not influence the reconstruction of the image matrix. In some embodiments, the compressed and rearranged image matrix may be stored in storage module 250. The information related to image matrix compression and rearrangement may be recorded in a lookup table, or stored in storage module 250.

Figure 11:
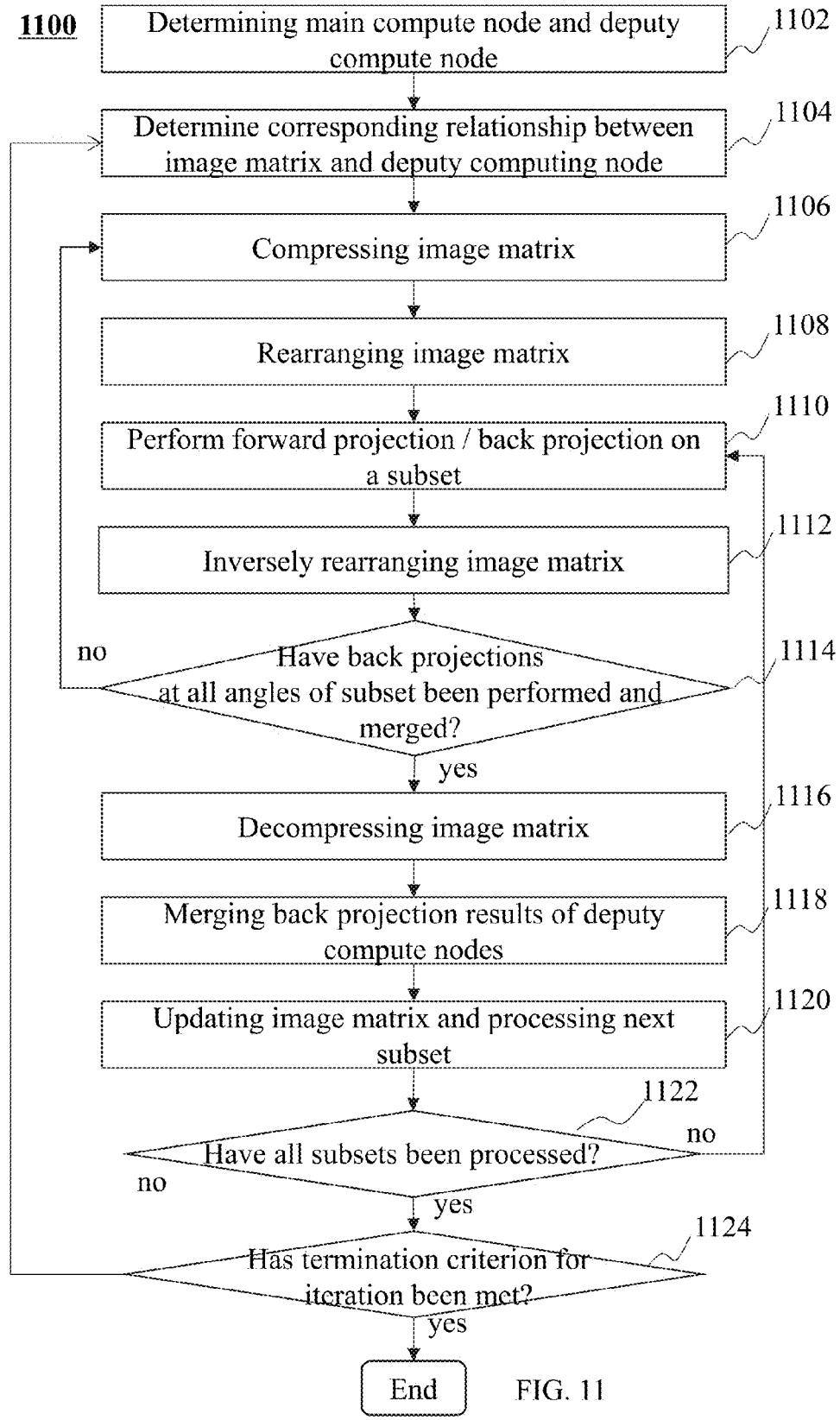
FIG. 11 is a flowchart illustrating an exemplary process for reconstructing an image matrix according to some embodiments of the present disclosure.

FIG. 11 is a flowchart illustrating an exemplary process for reconstructing an image matrix according to some embodiments of the present disclosure. Process 1100 may be performed by reconstruction module 220. In 1102, a main computing node and a subordinate computing node may be determined. The subordinate computing node may determine a sub-image matrix. The sub-image matrix may correspond to a sub-scanned region. For example, the sub-scanned region may be scanned by one or more detectors.

In some embodiments, the subordinate computing node may determine the values of one or more elements in a sub-image matrix corresponding to a sub-scanned region based on the count of detector corresponding to the the sub-scanned region. In some embodiments, the subordinate computing node may perform computational task of an image matrix corresponding to an imaging module pair. In some embodiments, the main computing node may merge and gather the computing results of one or more subordinate computing nodes.

In 1104, the computational tasks of image matrixes may be distributed to different subordinate compute nodes. In some embodiments, each subordinate compute node may determine an image matrix corresponding to a module pair.

In 1106 to 1108, an image matrix corresponding to an imaging module pair may be compressed and rearranged. More descriptions regarding the rearrangement and compression of an image matrix may be found elsewhere in the present disclosure. See, e.g., FIG. 9 through FIG. 10C, and the description thereof. Different image matrixes may be compressed and rearranged in different manners because different image matrixes may correspond to different imaging module pairs. As shown in FIG. 10A, a subordinate computing node may determine an image matrix corresponding to first imaging module 1011 and fourth imaging module 1014. The image matrix may be compressed and rearranged. The manner of image matrix compression and rearrangement may be determined based on the shaded portion between first imaging module 1011 and fourth imaging module 1014.

In some embodiments, a subordinate computing node may determine an image matrix corresponding to first imaging module 1011 (i.e. a rectangular region defined by the first detector). The subordinate computing node may compress the corresponding image matrix and determine the voxel sizes in the region corresponding to first imaging module 1011.

In 1110, a forward projection and/or a back projection may be performed based on a subset of a subordinate computing node. The forward projection may be performed to determine the counts of detectors along a line of response corresponding to a pair of imaging module based on the image matrix to be reconstructed. The back projection may be performed to determine the element value in the image matrix to be reconstructed based on the counts of detectors along the line of response corresponding to a pair of imaging module. Information related to coordinate transformation of the rearranged image matrix may be obtained from a lookup table.

In some embodiments, projection data may be divided into a plurality of groups. One or more groups of the plurality of groups may be a subset. For example, the projection data may be grouped according to the projection direction. In some embodiments, the image to be reconstructed may include a plurality of image matrixes corresponding to different layers. As shown in FIG. 4, image matrixes corresponding to different layers may have different voxel sizes. A line of response may penetrate a region that corresponds to the image matrixes of different layers. The contribution of one or more elements to the line of response may be calculated based on information related to the image matrixes of different layers which may be recorded in a lookup table. In some embodiments, the lookup table may record the relationships between the elements in one or more image matrixes.

In 1112, the rearranged image matrix may be rearranged inversely after the determination of element values. Operation 1112 may be performed by reconstruction module 220. The rearranged image matrix may be transformed back to the image matrix corresponding to the physical region.

In 1114, a judgment may be made as to whether back projections in all angles of the subset have been performed and merged. The back projections in all angles may refer to the back projections in all angles of the matched pair of imaging module. If not, 1106 to 1112 may be repeated, and the image matrix may be processed in a different angle. Otherwise, 1116 may be performed. In 1116, the image matrix may be decompressed by reconstruction module 220. The size of the image matrix after decompression may be the same with the size of the image matrix before compression.

In 1118, the main computing node may merge the back projection results of the subordinate computing nodes. In some embodiments, the decompressed image matrixes at different angels may have the same size. The main computing node may merge the decompressed image matrixes at different angles to generate a merged image matrix. Merely by way of example, the values of elements at the same positions in decompressed image matrixes at different angles may be added together to generate the merged image matrix.

In 1120, the main computing node may update the image matrix based on the merged matrix and start to process a next subset. The construction of the subset may be finished after the image matrix is updated. In some embodiments, reconstruction module 220 may reconstruct the image matrix based on next subset and update the image matrix based on the reconstruction result until all the subsets are processed. If all the subsets have been processed, 1116 and other subsequent steps may be performed. Otherwise, 1110 to 1120 may be performed again until all the subsets are processed. In some embodiments, an Ordered Subset Expectation Maximization (OSEM) algorithm may be applied to reconstruct the image matrix. When all the subsets are processed, the reconstructed image matrix may be output, and the iteration may be finished.

In 1124, a judgment may be made as to whether the termination criterion for the iteration has been met. If the termination criterion has been met, the iteration may be stopped. Otherwise, 1104 to 1124 may continue to be performed for next iteration. The termination criterion of iteration may be determined based on the image matrix to be reconstructed, or determined by a user. For example, the iteration may be ended when the difference between the reconstructed image matrix in the current iteration and that in the last iteration is less than a pre-set threshold. As another example, the iteration may be ended when the reconstructed image matrix in the current iteration meets a certain condition. As another example, the iteration may be ended when the number of iterations is larger than the pre-set number of iterations.

For persons having ordinary skills in the art, various modifications and changes in the forms and details of the application of the above method and system may occur without departing from the principles in the present disclosure. However, those variations and modifications also fall within the scope of the present disclosure. For example, a model of forward point spread function may be used before rearranging the image matrix and a backward point diffusion model may be used before rearranging the matrix inversely to amend the process of image reconstruction.

Figure 12:
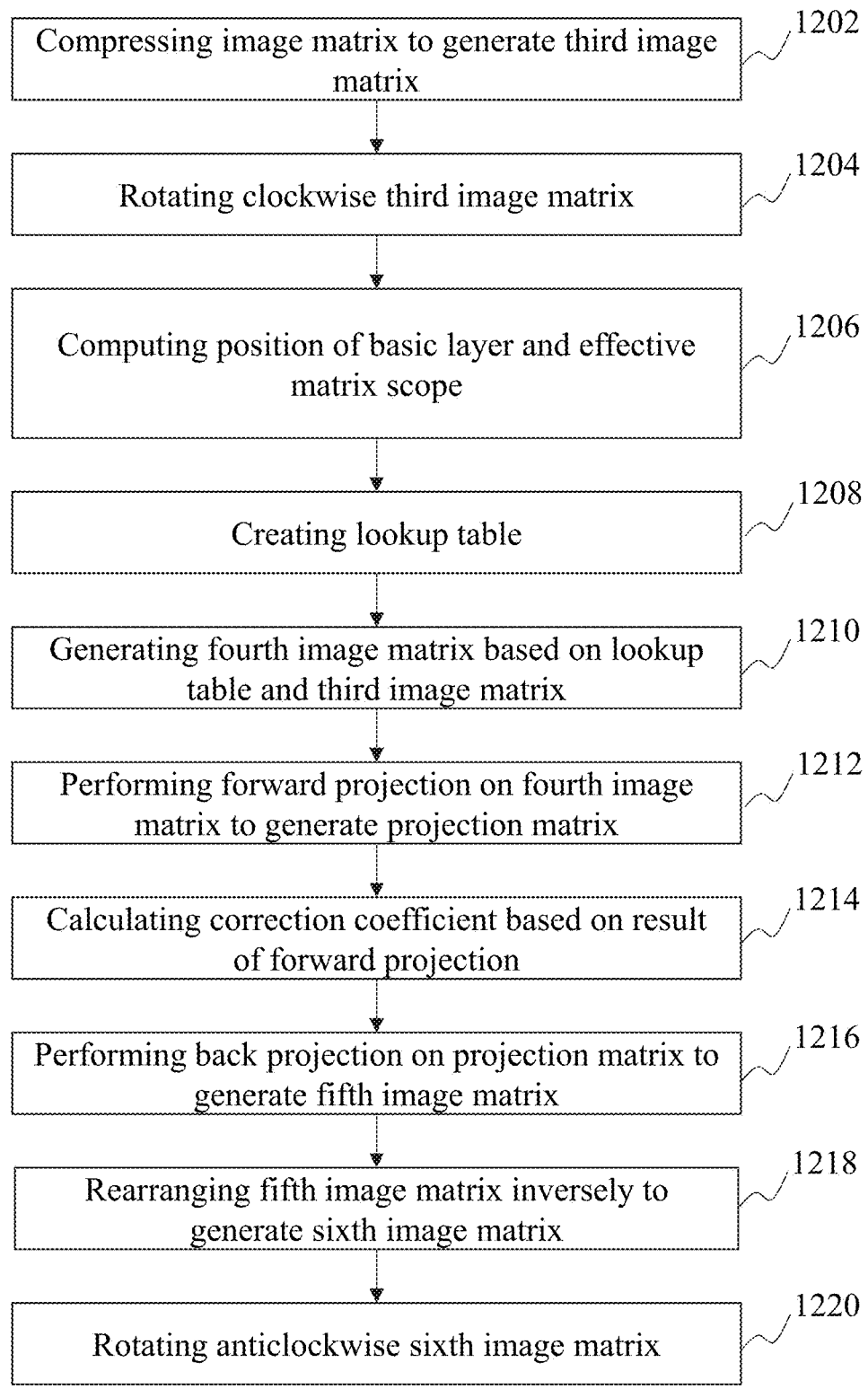
FIG. 12 is a flowchart illustrating an exemplary process for processing an image matrix according to some embodiments of the present disclosure.

FIG. 12 is a flowchart illustrating an exemplary process for processing an image matrix according to some embodiments of the present disclosure. Process 1200 may be performed by image matrix processing unit 350. In some embodiments, process 1200 described with reference to FIG. 12 may be an exemplary process for achieving 1106 to 1114 as shown in FIG. 11. In some embodiments, an imaging device may include one or more imaging modules. For example, one or more detectors of the one or more imaging modules may be continuously placed around the object. In some embodiments, the computational tasks of a pair of imaging modules may be performed by a subordinate computing nodes. The computation results of subordinate computing nodes may be collected and merged by a main computing node. In some embodiments, a pair of imaging modules may correspond to an image matrix. In 1202, image matrix processing unit 350 may compress the image matrix corresponding to a pair of imaging modules to generate a third image matrix.

In 1204, the third image matrix may be rotated clockwise. In 1206, image matrix processing unit 350 may determine the position of a basic layer and an effective matrix scope based on the pair of imaging modules corresponding to the third image matrix. The position of a basic layer and the effective matrix scope may refer to the moving position and direction of the element in the third image matrix in subsequent rearrangement steps.

In 1208, a lookup table may be created. The moving position and direction of the element in the third image matrix may be stored in the lookup table. Operation 1208 may be performed by matrix processing unit 350.

In 1210, image matrix processing unit 350 may generate a fourth image matrix based on the lookup table and the third image matrix. In some embodiments, the third image matrix may be rearranged to generate the fourth image matrix.

In 1212, a forward projection may be performed on the fourth image matrix to generate a projection matrix. In 1214, image matrix processing unit 350 may determine a correction coefficient based on the the result of the forward projection. The correction coefficient may include a ratio of the counts of detectors along a line of response to the forward projection of the fourth image matrix along the line of response.

In 1216, the back projection may be performed on the projection matrix to generate a fifth image matrix. In some embodiments, the fifth image matrix may be generated based on the correction coefficient.

In 1218, image matrix processing unit 350 may rearrange the fifth image matrix inversely to generate a sixth image matrix. In 1220, the sixth image matrix may be rotated anticlockwise. In some embodiments, the direction and size of the third image matrix may be the same as the sixth image matrix.

Having described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context comprising any new and useful process, machine, manufacture, or composition of matter, or any new and useful improvement thereof. Accordingly, aspects of the present disclosure may be implemented entirely hardware, entirely software (comprising firmware, resident software, micro-code, etc.) or combining software and hardware implementation that may all generally be referred to herein as a "block," "module," "unit," "component," "device" or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, comprising electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, comprising wireless, wireline, optical fiber cable, RF, or the like, or any suitable combination of the foregoing.

Computer program code for carrying out operations for aspects of the present disclosure may be written in any combination of one or more programming languages, comprising an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, comprising a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. An image reconstruction method for an imaging system, the method being implemented on a computing device having one or more processors and one or more storage media, the method comprising:
determining a first region of an object, the first region corresponding to a first voxels of a first voxel size;
determining a second region of the object, the second region corresponding to second voxels of a second voxel size, the first voxel size being different from the second voxel size;
acquiring, using the imaging system, scan data of the object including both the first region of the object and the second region of the object;
reconstructing a first regional image of the first region based on the scan data, wherein the reconstructing a first regional image includes:
determining a first image matrix corresponding to the first region, the first image matrix including first elements corresponding to the first voxels;
determining a second image matrix corresponding to the second region, the second image matrix including second elements corresponding to the second voxels;
performing a forward projection on the first elements corresponding to the first voxels and the second elements corresponding to the second voxels to generate projection data; and
performing a back projection on the projection data corresponding to the first voxels, and
simultaneously reconstructing a second regional image of the second region based on the scan data, wherein the reconstructing a second regional image further includes:
performing a back projection on the projection data corresponding to the second voxels.

2. The method of claim 1, wherein
the reconstructing a first regional image includes performing a first filtering on the first regional image; and
the reconstructing a second regional image includes performing a second filtering on the second regional image.

3. The method of claim 1, wherein
the reconstructing a first regional image includes iteratively reconstructing the first regional image based on the scan data for a first number of iterations, and
the reconstructing a second regional image includes iteratively reconstructing the second regional image based on the scan data for a second number of iterations.

4. The method of claim 3, wherein the first number of iterations is different from the second number of iterations.

5. The method of claim 3, wherein the reconstructing a first regional image or the reconstructing a second regional image is performed based on an Ordered Subset Expectation Maximization algorithm.

6. The method of claim 1, wherein:
the reconstructing a first regional image includes updating values of the first elements of the first image matrix iteratively; and
the reconstructing a second regional image includes updating values of the second elements of the second image matrix iteratively.

7. The method of claim 1, further comprising:
generating a lookup table, wherein the lookup table records a correlation between the first image matrix and the first voxels, or a correlation between the second image matrix and the second voxels.

8. The method of claim 7, wherein the correlation between the first image matrix and the first voxels includes a correlation between the first image matrix and a-rearranged first voxels.

9. The method of claim 6, further comprising:
generating a merged matrix; and
filling the merged matrix with the first image matrix and the second image matrix; wherein the merged matrix corresponding to a voxel size that equals to the smaller voxel size of the first voxel size and the second voxel size.

10. The method of claim 1, wherein the forward projection on the first elements corresponding to the first voxels and the second elements corresponding to the second voxels is performed along a line of response.

11. The method of claim 1, further comprising:
acquiring structure information of the object; and
determining the first region and the second region based on the structure information.

12. A system for image reconstruction comprising:
an imaging device configured to acquire scan data of an object, and
a processor comprising an acquisition module and a reconstruction module,
wherein the acquisition module is configured to:
determine a first region of an object, the first region corresponding to first voxels of a first voxel size,
determine a second region of the object, the second region corresponding to second voxels of a second voxel size, the first voxel size being different from the second voxel size, and
acquiring scan data of the object including both the first region of the object and the second region of the object; and
the reconstruction module is configured to
reconstruct a first regional image of the first region, wherein the reconstructing a first regional image includes:
determining a first image matrix corresponding to the first region, the first image including first elements corresponding to the first voxels;
determining a second image matrix corresponding to the second region, the second image including second elements corresponding to the second voxels;
performing a forward projection on the first elements corresponding to the first voxels and the second elements corresponding to the second voxels to generate projection data; and
performing a back projection on the projection data corresponding to the first voxels, and
simultaneously reconstruct a second regional image of the second region, wherein the reconstructing a second regional image further includes performing a back projection on the projection data corresponding to the second voxels.

13. The system of claim 12, wherein
the reconstructing a first regional image includes updating values of the first elements of the first image matrix iteratively; and
the reconstructing a second regional image includes updating values of the second elements of the second image matrix iteratively.

14. The system of claim 13, wherein the reconstruction module includes an image matrix processing unit configured to perform one or more operations on the first image matrix and the second image matrix; and wherein the operations include at least one of image matrix rotation, image matrix compression, image matrix decompression, image matrix rearrangement, image matrix filling, or image matrix merging.

15. The system of claim 12, wherein:
the reconstructing a first regional image includes iteratively reconstructing the first regional image based on the scan data for a first number of iterations, and
the reconstructing a second regional image includes iteratively reconstructing the second regional image based on the scan data for a second number of iterations.

16. The system of claim 15, wherein the reconstructing a first regional image or the reconstructing a second regional image is performed based on an Ordered Subset Expectation Maximization algorithm.

17. The system of claim 13, wherein the image matrix generation unit is further configured to:
generating a merged matrix; and
filling the merged matrix with the first image matrix and the second image matrix; wherein the merged matrix corresponding to a voxel size that equals to the smaller voxel size of the first voxel size and the second voxel size.

\* \* \* \* \*